No. 706,895. Patented Aug. 12, 1902.
L. H. BRITTON & H. W. MORROW.
MACHINE FOR MAKING SUCKERS OR DRINKING TUBES.
(Application filed Feb. 24, 1902.)
(No Model.) 3 Sheets—Sheet 1.
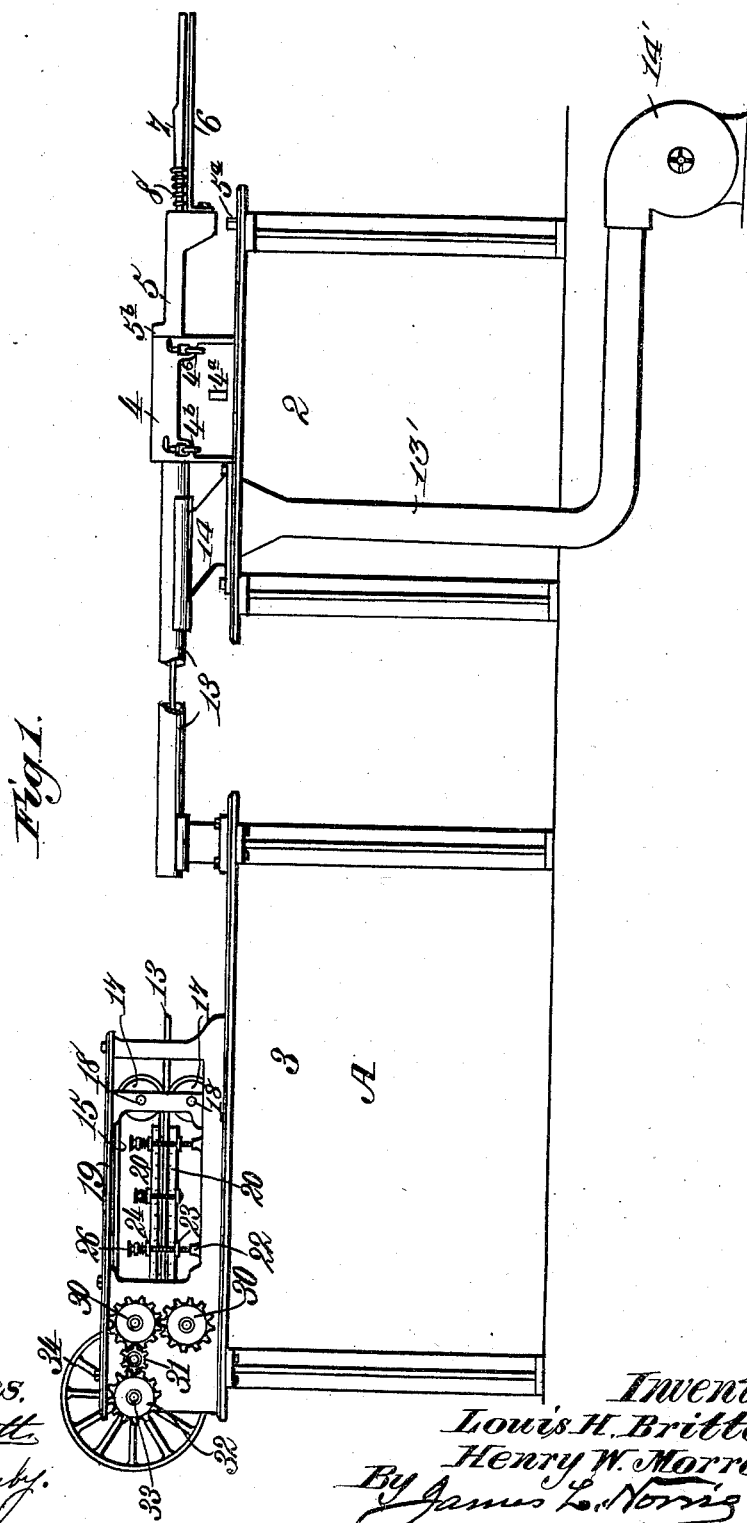
Witnesses.
Inventors.
Louis H. Britton.
Henry W. Morrow.
By James L. Norris
Att'y.

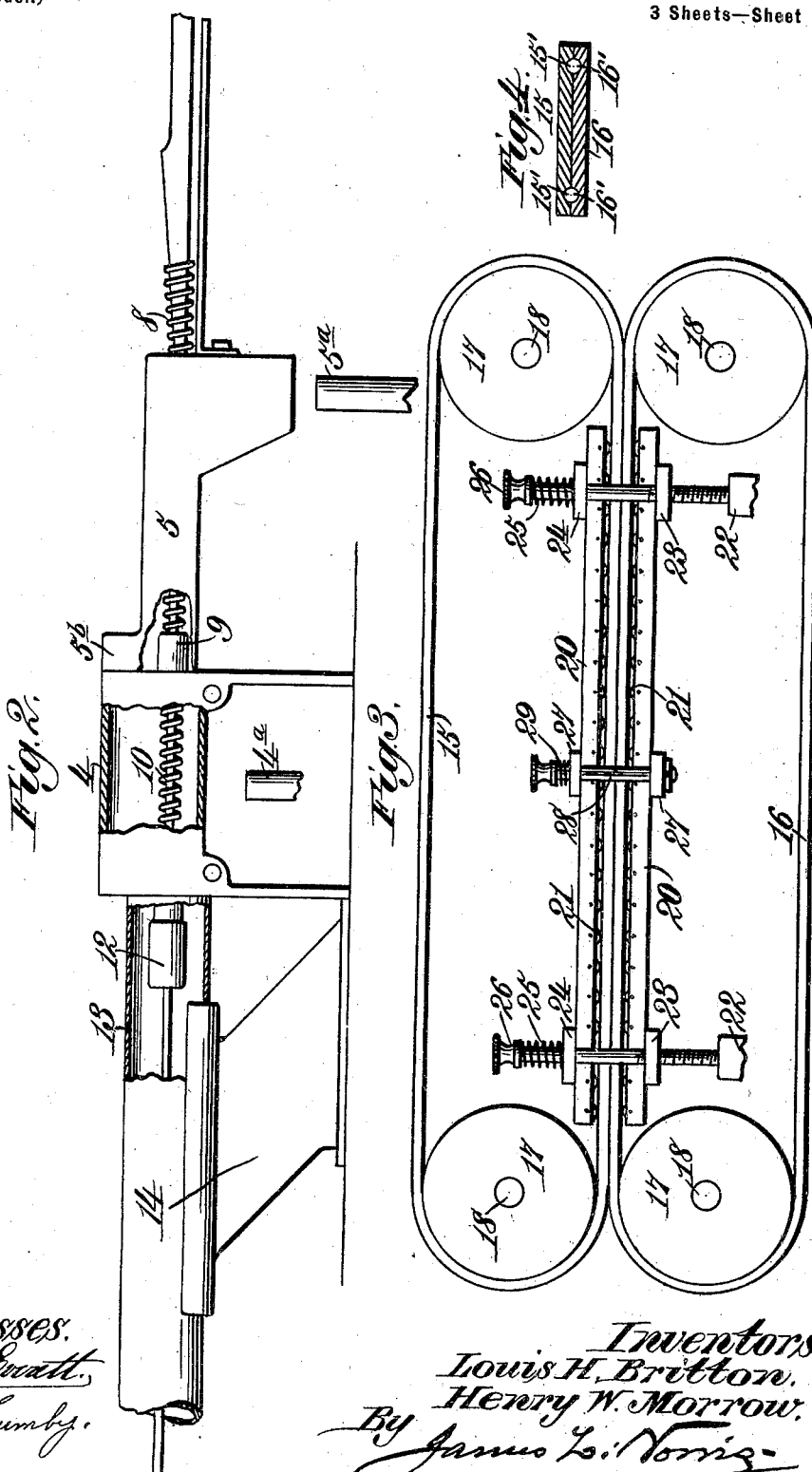

No. 706,895. Patented Aug. 12, 1902.
L. H. BRITTON & H. W. MORROW.
MACHINE FOR MAKING SUCKERS OR DRINKING TUBES.
(Application filed Feb. 24, 1902.)
(No Model.) 3 Sheets—Sheet 3.
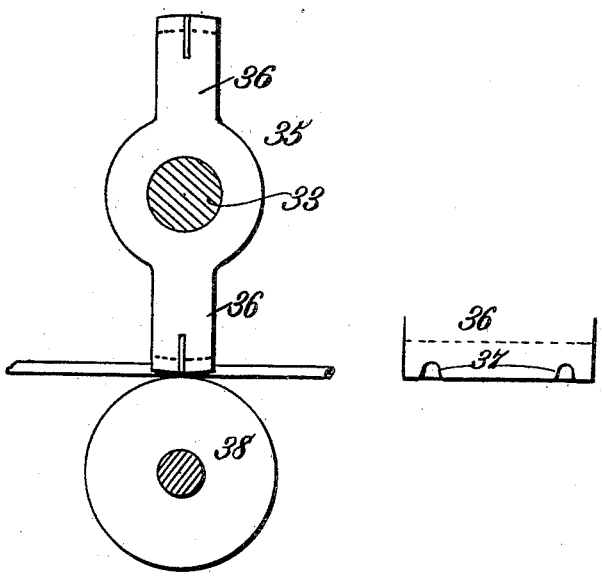
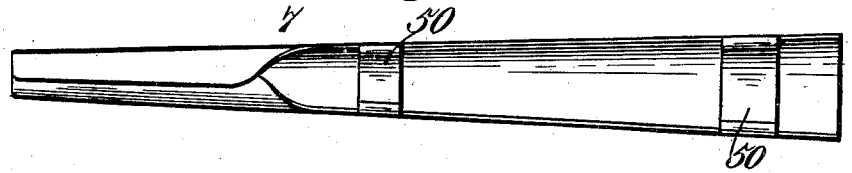
 
Witnesses:
Robert Everett
Dennis Sumby
Inventors,
Louis H. Britton,
Henry W. Morrow,
By James L. Norris
Atty.

UNITED STATES PATENT OFFICE.

LOUIS H. BRITTON AND HENRY W. MORROW, OF LISBON, OHIO, ASSIGNORS TO UNION MANUFACTURING COMPANY, OF LISBON, OHIO, A CORPORATION OF OHIO.

MACHINE FOR MAKING SUCKERS OR DRINKING-TUBES.

SPECIFICATION forming part of Letters Patent No. 706,895, dated August 12, 1902.

Application filed February 24, 1902. Serial No. 95,272. (No model.)

*To all whom it may concern:*

Be it known that we, LOUIS H. BRITTON and HENRY W. MORROW, citizens of the United States, residing at Lisbon, in the county of Columbiana and State of Ohio, have invented new and useful Improvements in Machines for Making Suckers or Drinking-Tubes, of which the following is a specification.

This invention relates to a machine for making what are known as "suckers" or "drinking-tubes;" and the objects and advantages of the invention will be set forth in the following description, while the novelty will form the basis of the accompanying claims.

The invention is clearly illustrated in the accompanying drawings, forming a part of this specification, and in which—

Figure 1 is a side elevation of a machine including our improvements. Fig. 2 is a longitudinal sectional elevation of the cooling-tube, coating and heating boxes, and forming device. Fig. 3 is a similar view of the tube-feeding device. Fig. 4 is a cross-section of the feed-belts. Fig. 5 is a detail view of the cutting mechanism. Fig. 6 is a plan view of the forming device; and Figs. 7 and 8 are cross-sections of the same, taken at different points.

Like characters refer to like parts in all the figures of the drawings.

The framework for supporting the different parts of the machine may be of any suitable character, and that represented is designated in a general way by A and includes the members 2 and 3, connected by a cooling-tube, as hereinafter set forth, and supporting, respectively, different parts of the apparatus, as will hereinafter appear.

A coating box or casing, as 4, hereinafter more particularly described, is supported by suitable standards upon the frame member 2 and in turn carries a heating-box, as 5, also hereinafter described. Said heating-box 5 carries a bearing, as 6, shown as an L-shaped bar, upon the long or horizontal arm of which is mounted a forming device, as 7. This forming device serves to shape a web or ribbon of paper into a tube, which is advanced through the machine and which, near the leaving end thereof, is cut into suitable lengths to produce the suckers or drinking-tubes.

We have not shown any web or ribbon of paper nor any means for supporting the same in proximity to the forming device, as this forms no part of the invention. The forming device 7 may be made of any suitable material or size, it being of tapered form, the reduced end being at the left, while the wider or entering end is shown at the right or outside, and the web or ribbon of paper (not shown) is initially placed in this wide end. The wide or broad end of the forming device is bent to form the segment of a circle, the curvature being gradually increased toward the inner or leaving end of said forming device, where the edges of the same are caused to overlap, with a small space between said lapped portions in which the overlapping edge of the paper-tube stream passes. By reason of this open lap the outer lap of the paper-tube stream will be carried between said overlapping edges of the forming device at the discharge end thereof, so that friction of the paper tube as it leaves the forming device is prevented. The paper ribbon or web is drawn through the forming device, which is of progressively-decreasing form from the entering to the exit end thereof and is of tubular form at the left, whereby the web or ribbon is given such form. The paper tube is therefore made in a continuous form, being successively treated at different points in its movement, and finally is cut into suitable lengths to make suckers or drinking-tubes. The paper-tube stream when it emerges from the forming device 7 enters a device which serves to preserve the tubular form, and in the present case this device consists of an open coil, as 8, the right end thereof being shown as enlarged to freely receive the exit end of the forming device 7, while the inner or left end is contained in a bored support, as 9, projecting from the coating-box 4. The paper-tube stream as it leaves the forming device enters the coil 8, the convolutions of which serve to hold said paper-tube stream in its proper shape. The coil 8 is inclosed by the heating-box 5, the interior of which may be heated in any suitable manner. The heat within the box by coming in contact with paper-tube stream, which it can reach through the spaces between the convolutions of the coil 8, deprives the paper-tube stream of its moisture and causes it to retain its tubular form after passing the coil 8. The box 5 may be heated in any convenient manner, it being shown provided with a burner, as 5ª, for a suitable combustible, and a chimney 5ᵇ for the purpose of creating a draft and for the escape of the products of combustion. The stream after passing through the heating-coil 8 and the bored support 9 enters the coating-box 4, containing a suitable coating and waterproofing material, (such as paraffin,) which also waterproofs the stream and provides a means for holding its lapped edges together. The coating-box 4 is provided interiorly with an open coil, as 10, arranged in the path of and through which the stream passes, said coil being suitably supported in the coating-box and being of a diameter equaling that of the coil 8. The convolutions of the coil 10 serve to hold the lap-seam of the stream smooth and flat and prevent an excessive application of the coating or stiffening material from entering the tube-stream. The spaces between the convolutions of the coil 10 permit the coating or stiffening material within the coating-box 4 to come in contact with the tube-stream, by reason of which it is properly permeated and coated. The coating-box 4 is provided with a suitable burner, as 4ª, by which the contents can be maintained in a desired fluid condition, and in practice it will be furnished with one or more draw-off cocks, as 4ᵇ, by which said contents may be removed when desired. The stream when it leaves the coating-box 4 passes through a packed gland, as 12, which prevents an excess of coating substance from flowing from the coating-box and at the same time removes surplus coating from said stream. The stream as it leaves the gland 12 enters a cooling-tube, as 13, the bearings of which are carried by the separated frame members 2 and 3. This tube 13 is comparatively long, and it has an opening in its bottom to which a pipe or conduit, as 14, is connected, said conduit being also connected by means of the pipe 13′ with an air-blast apparatus of some suitable kind (as a fan 14′) and being inclined so as to direct the cooling currents of air toward the left or exit end of the tube. The streams when they leave the tube are taken by suitable drawing mechanism, including superposed endless belts, as 15 and 16, arranged in parallelism, the pulleys 17 of which are carried by shafts, as 18, rotatively supported by an auxiliary frame, as 19, carried upon the upper side of the frame member 3. The working or outer faces of the belts or bands 15 and 16 are grooved longitudinally, as at 15′ and 16′, respectively. The lower run of the upper belt and the upper run of the lower belt travel in contact and in a similar direction, (toward the left,) and the parallel grooves 15′ and 16′ in their faces are adapted to receive the streams, so as to advance or pull the same through the machine, the streams after they leave the belts being cut off by suitable knives. The working runs of the belts 15 and 16 are brought into proper contact with the streams by grip-plates, as 20, carrying on their lower and upper sides, respectively, rows of anti-friction-rolls, as 21, adapted to directly engage the upper and lower faces, respectively, of said working runs. These rolls 21 reduce friction, while insuring proper hold of the belts upon the streams. The grip-plates are located in parallelism one above the other inside the respective belts and are adjustably supported. Parallel standards or uprights, as 22, rise from the auxiliary frame 19 at different points in its length, and said standards are united below the lower grip-plate by cross-bars, as 23, held in place by being threaded onto said standards. These bars 23 uphold the lower grip-plate. Similar cross-bars, as 24, bear against the upper side of the upper grip-plate and are fitted over the standards 22, said cross-bars being adapted to receive coiled springs, as 25, encircling the standards and held in place by nuts, as 26, by turning which the pressure of the grip-plates can be properly regulated. Similar cross-bars, as 27, are arranged between the pairs of standards 22, and they are yieldingly connected by screw-bolts 28 and coiled springs 29. The streams when they leave the belts 15 and 16 are brought under the action of knives operatively connected to said belts, so as to act in unison. The left pulleys 17 have meshing gears 30, by which the lower belt can be driven, the upper gear meshing with a pinion 31 on a stub-shaft carried by the auxiliary frame 19, which in turn meshes with and is driven by the gear 32 on the main shaft 33. Said main shaft 33 is shown as carrying fixed and idle pulleys, each designated by 34, adapted to receive a belt (not shown) connected with a suitable motor. When the belt is on the fixed pulley, the main shaft 33, and hence the belts 15 and 16, will be simultaneously driven.

The cutter is denoted by 35, and it is suitably fixed to the main shaft 33 and includes a body portion or hub having radial arms, as 36, (two being shown.) The cutting edges at the outer ends of these arms have concaved recesses, as 37, to receive the streams as they are drawn forward by the belts. The streams at the place where they are severed are supported by a roll, as 38, the periphery of which acts as a suitable base against which the knife can act, and as the radial arms 36 rotate their cutting edges are brought against the knife-roll 38 and act to separate the stream into desired lengths, which form the suckers or drinking-tubes. The mechanism for drawing the streams is so timed with respect to the cutting-off mechanism that the streams are drawn through the machine the requisite distance before being severed.

The forming device 7 has at different points in its length paper-guides, as 50, shaped to conform with the curvature of the inside of said forming device. These guides are suitably held in the forming device, and the paper passes between them and the concaved body of the forming device, the guides serving to hold the paper straight and true as it passes through said forming device.

On referring to Fig. 4 it will be seen that the belts are arranged for drawing a plurality of tubular streams, and in Fig. 5 we have shown the cutting mechanism for severing the said streams, as in order to increase the output of the machine we advance a series of such streams, although we have illustrated in the remaining figures one set of coils, &c. As to this point, however, the invention is not limited.

In certain views we have shown a part of the tubular stream, the same being denoted by 13'.

It will be evident from the foregoing description that our improved machine includes heating and coating boxes each containing an open-work tubular member, and the internal diameters of these tubular members are substantially equal to that of the leaving end of the forming device, so that when the stream passes from the latter successively through said open-work tubular members it will be held in proper condition, and the open-work tubular member in the heating-box permits the entrance of heat to the stream for holding it set, while the other open-work tubular member permits the coating material to properly reach said stream.

The invention is not limited to the construction previously described, for many variations within the scope of the appended claims may be made.

Having described the invention, we claim—

1. In a machine of the class specified, a heating-box, an open coil inclosed by said heating-box, means for forming a paper-tube stream, said open coil being arranged to receive said stream from the forming means, and a coating-box containing an open coil, the latter being arranged to receive the stream from the heating-box, and means for feeding the stream.

2. In a machine of the class specified a heating-box, an open coil inclosed by the heating-box, means for forming a paper-tube stream, and said open coil being arranged to receive the paper-tube stream from the forming means, a coating-box, an open coil arranged in said coating-box and adapted to receive said stream, means for advancing the paper-tube stream, and means for applying a blast of air to the latter when it emerges from the coating-box.

3. In a machine of the class specified, a coating-box, means for forming a paper-tube stream, said stream being arranged for passage through said box, and an open coil in said coating-box through which said stream is arranged to pass.

4. In a machine of the class specified, a coating-box, means for forming a paper-tube stream, said stream being arranged for passage through said box, an open coil in said coating-box through which said stream is arranged to pass, and means for removing an excess of coating from the stream as it emerges from said box.

5. In a machine of the class specified, a coating-box, means for forming a paper-tube stream, said stream being arranged for passage through said box, an open coil in said coating-box through which said stream is arranged to pass, and means for applying heat to the stream before it enters the coating-box.

6. In a machine of the class specified, a coating-box, means for forming a paper-tube stream, said stream being arranged for passage through said box, an open coil in said coating-box through which said stream is arranged to pass, means for applying heat to the stream before it enters said coating-box and means for directing a blast of air to the stream after it leaves said coating-box.

7. In a machine of the class specified, means for forming a tubular stream, a coating-box arranged to receive the tubular stream, a tube through which the stream is adapted to pass after it leaves the coating-box, means for feeding the stream, and means for delivering a blast of air through said tube.

8. In a machine of the class specified, a heating-box, an open coil inclosed by said heating-box, means for forming a paper-tube stream, said open coil being arranged to receive said stream from the forming means, a coating-box containing an open coil, the latter being arranged to receive the stream from the heating-box, a pair of belts grooved to receive said stream and means for operating said belts.

9. In a machine of the class specified, a heating-box, an open coil inclosed in said heating-box, means for forming a paper-tube stream, said open coil being arranged to receive said stream from the forming means, a coating-box containing an open coil, the latter being arranged to receive the stream from the heating-box, a pair of belts grooved to receive said stream and adjustable plates carrying antifriction-rolls against which the working portions of the belts are arranged.

10. In a machine of the class specified, a heating-box, an open coil inclosed by said heating-box, means for forming a paper-tube stream, said open coil being arranged to receive said stream from the forming means, a coating-box containing an open coil, the latter being arranged to receive the stream from the heating-box, means for feeding the stream and means for severing the stream into desired lengths after it leaves the feeding means.

11. In a machine of the class specified, a heating-box, an open coil inclosed by said heating-box, means for forming a paper-tube stream, said open coil being arranged to receive said stream from the forming means, a coating-box containing an open coil, the latter being arranged to receive the stream from the heating-box, a pair of belts grooved to receive said stream, means for holding the working portions of the belts in contact with said stream, a roll to support the stream after it leaves the belts and a knife arranged to cut said stream while on said roll, the knife being arranged to come in contact with the roll.

12. In a machine of the class specified, a heating-box, an open coil inclosed by said heating-box and a forming device tapering from one end toward the other, the broader end being of segmental form, the curvature being gradually increased toward the smaller end and the edges of said forming device being overlapped and spaced apart at the small end, said coil being adapted to receive the tubular stream from said forming device, a coating-box containing an open coil, the latter being arranged to receive the stream from the heating-box, and means for feeding the stream.

13. In a machine of the class specified, a coating-box, a forming device adapted to form a tubular stream and the latter being adapted for passage through said coating-box, and an open-work tubular member in said coating-box through which said stream is arranged to pass, the internal diameter of said tubular member being substantially the same as that of the leaving end of the forming device.

14. In a machine of the class specified, a heating-box, means for forming a stream and the heating-box being adapted to receive the stream after it is formed, a coating-box adapted to receive the stream from the heating-box, means for guiding the stream through said heating and coating boxes, a tube adapted to receive the stream from the coating-box and having an opening for the admission of a blast of air, means for feeding the stream, and means for delivering a blast of air into said tube.

15. In a machine of the class specified, a heating-box having an open coil, means for forming a tubular stream and said open coil being adapted to receive the tubular stream, a coating-box having an open coil adapted to receive the stream after it leaves the heating-box, an elongated tube through which the stream is adapted to pass after it leaves the coating-box and having an opening for the admission of a blast of air, means for removing the excess of coating from the stream when discharged from the coating-box means for feeding the stream, and means for delivering a blast of air into said tube.

16. In a machine of the class specified, a heating-box, an open coil inclosed by said heating-box, and a forming device for forming a tubular stream and said coil being arranged to receive said tubular stream from the forming device, and the internal diameter of said coil being substantially the same as that of the leaving end of said forming device.

17. In a machine of the class described, a heating-box, an open coil inclosed by said heating-box, a forming device for forming a tubular stream and said coil being arranged to receive said tubular stream from the forming-means device, and the internal diameter of said coil being substantially the same as that of the leaving end of said forming device for applying a coating to the stream, and means for feeding the stream and cutting it into desired lengths.

18. In a machine of the class specified, a heating-box and a forming device for forming a tubular stream, said stream being adapted to enter the heating-box after it leaves the forming device, and an open-work tubular member in said heating-box through which the stream is adapted to pass, and the internal diameter of said open-work tubular member being substantially the same as that of the leaving end of said forming device.

19. In a machine of the class specified, a forming device adapted to form a tubular stream, heating and coating boxes through which said stream is adapted to successively pass, and open-work tubular members in said boxes adapted to receive said stream, and the internal diameters of said open-work tubular members being substantially the same as that of the leaving end of said forming device.

In testimony whereof we have hereunto set our hands in presence of two subscribing witnesses.

LOUIS H. BRITTON.
HENRY W. MORROW.

Witnesses:
HARRY V. GEORGE,
WILLIAM C. MORROW.